Figure 1:
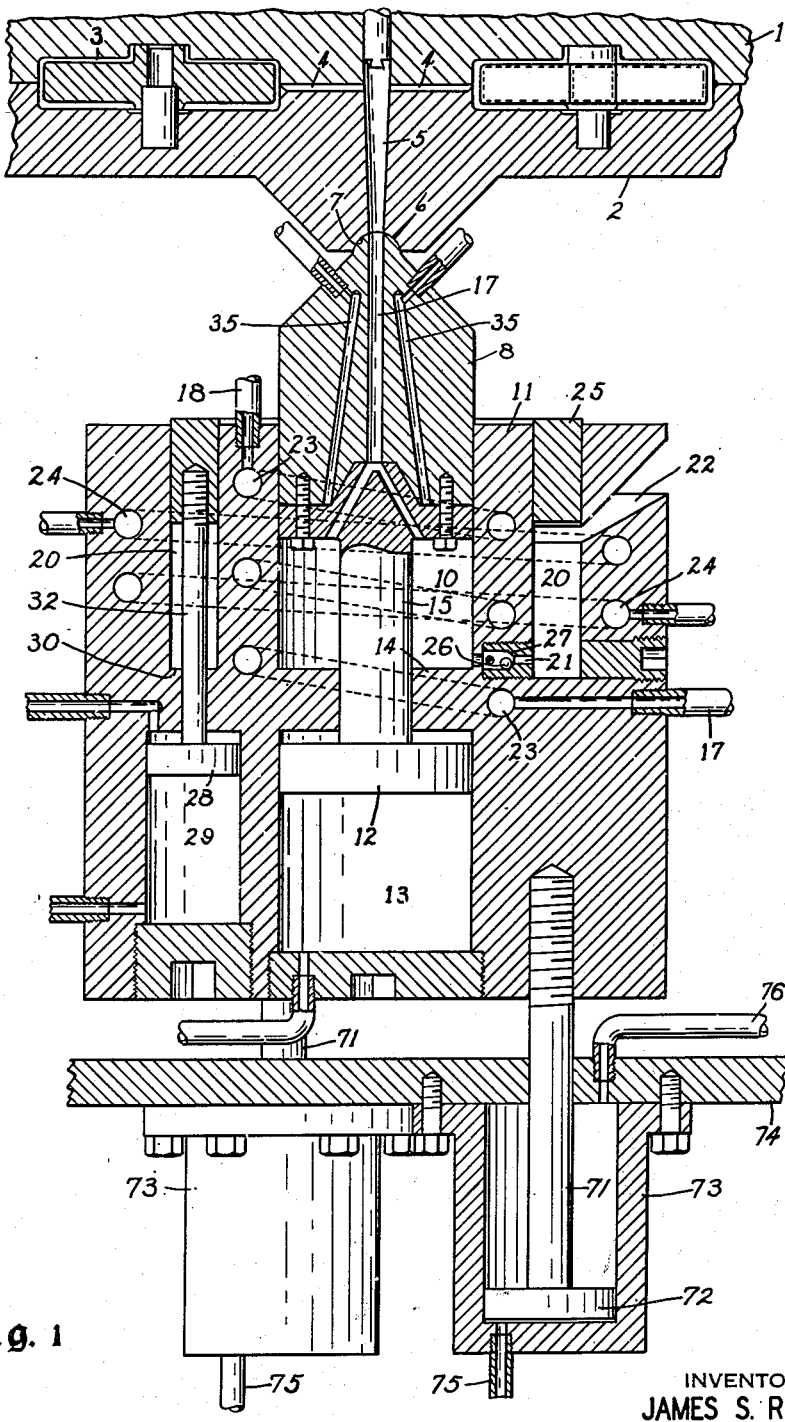

April 14, 1942.     J. S. REID     2,279,344
INJECTING METHOD AND MEANS FOR MOLDING THERMOPLASTIC MATERIALS
Filed Feb. 19, 1937     2 Sheets-Sheet 1

INVENTOR
JAMES S. REID
BY
Hyde and Meyer
ATTORNEYS

Patented Apr. 14, 1942

2,279,344

UNITED STATES PATENT OFFICE 2,279,344

INJECTING METHOD AND MEANS FOR MOLDING THERMOPLASTIC MATERIALS

James S. Reid, Shaker Heights, Ohio, assignor, by mesne assignments, to The Standard Products Company, Port Clinton, Ohio, a corporation of Ohio Application February 19, 1937, Serial No. 126,679

9 Claims. (Cl. 18—30)

This invention relates to an improvement in methods of injection molding and in injection type molds for molding thermoplastic material and is directed particularly to a novel construction of an injecting device which is more compact and less costly than prior devices such as shown in applications Serial No. 107,568, filed October 26, 1936, and Serial No. 61,864, filed February 1, 1936, the latter being Patent 2,156,396, issued May 2, 1939.

In each of these prior devices, relatively long heating tunnels and passages are provided for initially heating the thermoplastic material and conveying it to an associated injection chamber.

In using such prior devices, it has been difficult to produce the desired artistic color striations on the surface of molded articles when varicolored thermoplastic material is employed. By carefully studying the results obtained in commercial practice, it has been found that such difficulty is due principally to the relatively long and irregular path of travel which the thermoplastic material follows in passing from the loading chamber to the gate entering into the mold cavity and also to the fact that the material is introduced into the injection cylinder at only one orifice and must flow and eddy and become thoroughly mixed in the cylinder. All of these conditions tend to produce a relatively uniform mixture of the pigment with a resultant generally uniform blended color over the entire area instead of variegated patches and striations of contrasting color and the attendant decorative effects. By reducing this relatively long path of travel, the granules of various colors of thermoplastic material are not given the opportunity to intermingle to any great extent with other granules of different colors during the passage from the heating chamber to the mold cavities, with the result that, while retaining the advantage of injection molding, control of the color design is almost as effective as that obtained in the compression method of molding.

One of the principal objects of the present invention, therefore, lies in the provision of an injection type mold having the loading and injecting chambers in close proximity to each other and connected by a plurality of relatively short straight ducts uniformly distributed peripherally of the injection chamber.

An equally important object is to provide in such a mold a substantially direct path of travel with relatively few turns or bends between the loading chamber and mold cavity.

Another important object is to provide a method and means for producing the desired color effects on thermoplastic molded articles.

Figure 2:
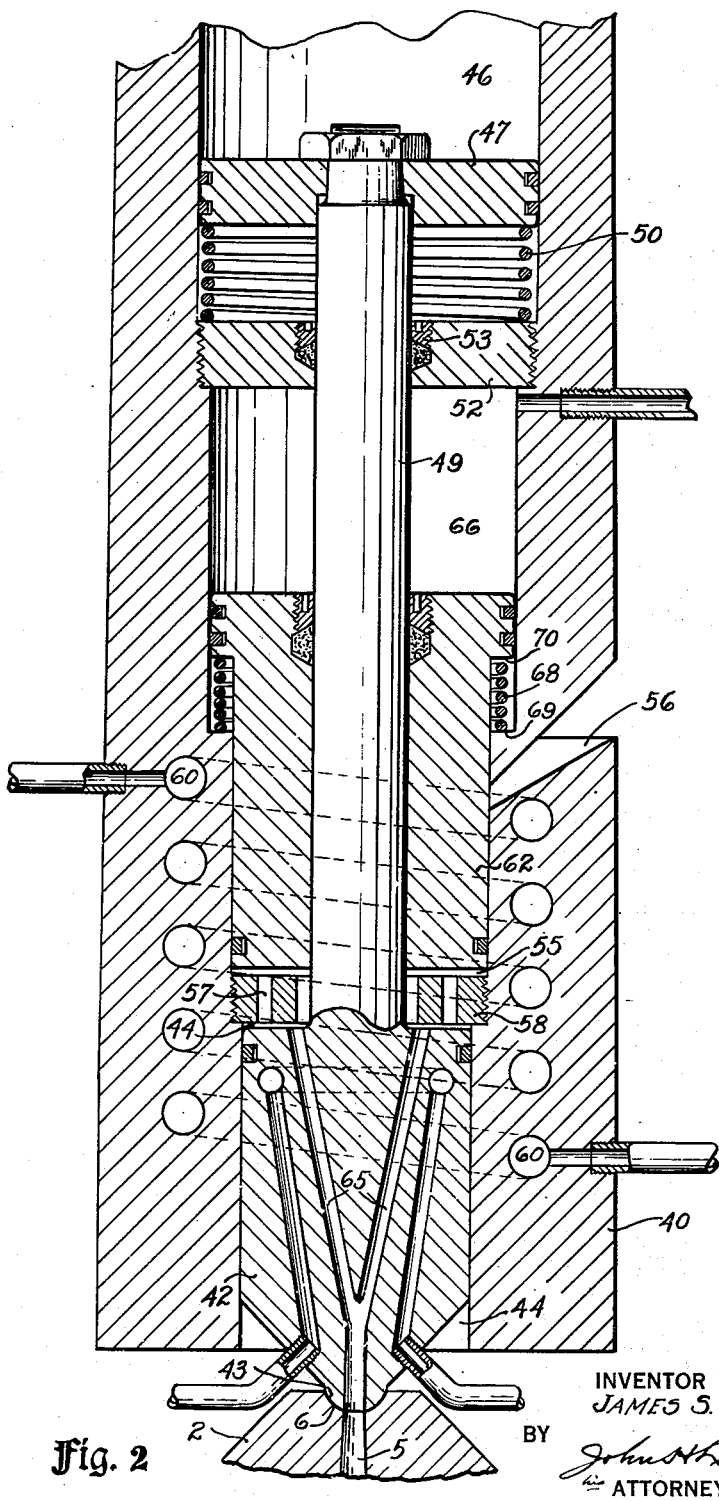

Other objects and advantages will become apparent from the following specification wherein reference is made to the accompanying drawings disclosing a preferred illustrative embodiment of the invention and in which:

Fig. 1 is a fragmentary vertical sectional view through the injecting cylinder and loading chambers and through a portion of an associated mold; and Fig. 2 is a fragmentary vertical sectional view through a modification of the invention.

Referring to Fig. 1, the construction embodying one form of the present invention is shown associated with a mold having an upper mold section 1 in closed relation with an associated lower mold section 2. These sections are provided with recesses in their abutting faces forming cavities 3 in the form of the articles to be molded.

Leading to each of the cavities 3 is a gate 4 into which a sprue passage 5 opens. The walls of the sprue passage 5 preferably converge in the direction away from the gates 4 so that the material when solidified within the sprue passage can be ejected easily and concurrently with the finished articles. The entrance to the sprue 5 is provided with a cup-shaped seat 6 against which a nozzle portion 7 abuts to form a tight joint and thus prevent the escape of thermoplastic material therebetween being transferred from the nozzle to the sprue. This nozzle 7 is preferably carried by an injecting piston 8 which is reciprocable in an injecting cylinder 10 provided in a carrying block 11.

This piston 8 is reciprocated outwardly and inwardly of the injecting cylinder 10 to effect the contact and separation, respectively, of the nozzle and seat by means of a hydraulic piston 12 and cylinder 13. The cylinders 10 and 13 are shown coaxially disposed with respect to each other in the carrying block 11 and are separated from each other by a wall 14 through which an associated piston rod 15 passes to join to the pistons 8 and 12.

The cylinder 10 is adapted to retain a charge of thermoplastic material in the proper injecting condition, which charge is expelled therefrom through a passage 17 in the piston 8 by moving the entire carrying block 11 toward the mold sections and relative to the piston 8. The passage 17 is in direct alignment with the sprue passage 5 and thus conducts the material from the cylinder 10 directly into the sprue passage 5.

After the charge has thus been expelled from the injecting cylinder 10, a new charge of thermoplastic material is introduced therein from an annular loading chamber 20 which is shown closely surrounding the cylinder 10 and in communication with cylinder 10 by a plurality of short passages 21 preferably located adjacent the wall 14. These passages 21 are rendered active simultaneously to inject the thermoplastic material into the cylinder 10 at differently spaced regions, whereby the various colors in the material are not mixed and agitated during the transference thereof to the cylinder 10, and thus the surface of the molded article is artistically decorated with sharply contrasted color striations.

The thermoplastic material is preferably introduced into the loading chamber 20 in granular form, through suitable loading ports 22 provided in the outside walls of the carrying block 11 and respective to the passages 21.

After the charge of thermoplastic material in the loading chamber 20 has become properly heated to the plastic state by passing steam through ducts 23 and 24 which surround the cylinder 10 and chamber 20, the molten material is forced from the chamber 20 by means of an annular plunger or piston 25 which closely fits the inner and outer walls of the chamber. Thus, upon the inward movement of the piston 25, the thermoplastic material is transferred to the injecting cylinder 10 through the short, direct passages 21.

Since the loading chamber 20 and injecting cylinder 10 are disposed closely adjacent each other, a more accurate control of the appearance of the thermoplastic coating can be obtained. Thus the granules of different colors are not given the opportunity to become mixed in the process of being transferred from the chamber 20 to the cylinder 10. This unmixed charge of material containing streaks and patches of different colors is transferred in the unmixed condition into the mold cavities where it produces a very attractive appearing surface of various color striations.

This arrangement provides a distinct advantage over prior molds of the injection type. In such prior molds the material was not introduced into the injection chamber with each color in a separate location and was necessarily forced to flow through relatively long pre-heating tunnels and passages with bends and turns before entering the injecting cylinder, wherefore the different colored granules of material inherently became so thoroughly mixed that all of the colors, when molded upon the insert, appeared to be blended together instead of remaining in patches or streaks of contrasting colors as desired.

The passages 21 are shown provided with check valves which act to prevent the flow of the material from the cylinder 10 back into the chamber 20. Each of the check valves includes a ball 26 and a seat 27, the ball being forced against the seat when the pressure on the material in the cylinder 10 exceeds the pressure in the loading chamber 20.

The piston 25 is moved longitudinally of the chamber 20 and parallel to the movement of the piston 8, by a plurality of suitable hydraulic pistons 28 and cylinders 29 which are located in alignment with the path of travel of the piston 25. The cylinders 29 and chamber 20 are separated by a wall 30 through which suitable piston rods 32 pass to connect the pistons 28 to the ring piston 25.

To reciprocate the piston 25 relative to the carrying block 11, fluid pressure is introduced into the cylinders 29 so as to act against the upper faces of each of the pistons 28, causing the piston 25 to be drawn within the chamber 20. Thus the movement of the piston 25 against the charge of thermoplastic material within the chamber 20 transfers the material to the injecting cylinder 10. This charge of thermoplastic material within the cylinder 10 is now in position to be injected into the mold cavities 3.

The injecting operation may be accomplished in any one of several different cycles, the preferred one of which is as follows:

The mold sections 1 and 2 first close around the inserts to be coated with material, to form the cavities 3. While the sections are thus closed, the piston 8 is moved outwardly from the carrying block 11 by admitting fluid pressure into cylinder 13 to act against the lower face of the associated piston 12. The resultant outward movement of piston 8 causes the nozzle 7 to rest in firm pressure engagement against the seat 6. Usually this movement is very slight since the cylinder 10 has been previously filled with a charge of thermoplastic material and the piston 8 is accordingly in extended position with respect to the carrying block 11. To inject this charge into the cavities, the entire carrying block 11 is forced to move relative to the piston 8 and toward the mold sections by a suitable pressure means, which movement causes the material in the cylinder 10 to be forced through passage 17, sprue 5, gates 4 and into the cavities 3. During this injecting operation, the liquid in cylinder 13 is allowed to escape and the piston 12 moves freely relative thereto.

The carrying block 11 may be raised and lowered relative to piston 8 by any convenient means familiar to those skilled in the art. One such means is shown in Fig. 1 wherein the block 11 has affixed thereto a plurality of connecting rods 71 bearing, at their other extremities, pistons 72 which reciprocate in cylinders 73 which are attached to a bed plate 74 of the machine frame. The pistons may be moved upwardly by fluid pressure from a convenient pressure source through conduits 75, and, after the injecting operation is completed, the pistons may be retracted by fluid pressure through conduits 76.

A new charge, previously placed in the loading chamber 20, is then transferred to the injecting cylinder 10 by moving the piston 25 inwardly of the chamber 20 through the medium of the cylinder and piston mechanisms 28 and 29. The piston 8 is extended relative to the carrying block and concurrently with the transferring operation by again admitting hydraulic pressure into the cylinder 13. After the charge has thus been transferred and the cylinder 10 again filled, the piston 25 is moved outwardly of the chamber 20 and a fresh charge of thermoplastic material is introduced therein and heated preparatory to a subsequent injecting operation.

The nozzle 7 breaks contact from the seat 6 by moving the carrying block 11 and piston 8 away from the mold sections to permit the separation of the sections 1 and 2 and ejection of the articles.

The mold sections 1 and 2 being relatively cool causes the material to solidify in the cavities 3, gates 4 and the sprue 5 down to the seat 6 while the material in the passage 17 remains heated and plastic through the continuous passage of steam through ducts 35 in the piston 8. Consequently, when the mold sections 1 and 2 are opened and ejection of the finished articles from the cavities 3 takes place, the entire amount of material injected into the mold sections 1 and 2 is concurrently removed.

Referring now to Fig. 2, a modification of the device is disclosed which comprises a carrying block 40 preferably cylindrical in shape and positioned above the mold sections 1 and 2 and mounted on a suitable frame, not shown, for movement toward and away from the sections in any well known manner. The carrying block 40 carries therewith an injecting piston 42 having a nozzle or seat engaging portion 43, similar to the piston and nozzle portion 8 and 7, respectively, in the previously described form. The piston 42 acts within a cylinder 44 in the carrying block 40 and is reciprocable within the said cylinder by means of a suitable hydraulic cylinder and piston arrangement shown at the opposite end of the carrying block and designated 46 and 47, respectively.

The pistons 47 and 42 are directly connected to each other through the medium of a piston rod 49. Thus, in order to move the piston 42 with respect to the carrying block 40, hydraulic pressure is admitted into the cylinder 46 which acts against the upper face of piston 47 causing both pistons 47 and 42 to move downwardly concurrently.

The piston 42 may be retracted within the block by a suitable compression spring 50 which reacts between the lower face of the piston 47 and a suitable partition 52 threaded to the lower end of the cylinder 46. The piston rod 49 extends through this partition and in order to prevent leakage of fluid from one side of the partition to the other a suitable packing 53 is provided around the rod 49.

The thermoplastic material is initially introduced into a cylindrical loading chamber 55, through suitable openings 56 in the sides of the carrying block 40, which are located between the piston 42 and piston 47. The chamber 55 and cylinder 42 are coaxially disposed and in close proximity to each other and are connected together by passages 57 in a partition 58.

After the material has been dropped through the openings 56 into the chamber 55, it is heated to the plastic state, such, for example, as by passing steam through ducts 60 provided in the carrying block 40. The resulting molten material is then forced from the chamber 55 through the passages 57 and into the cylinder 44 by the downward movement of a hydraulically operated plunger 62 which is reciprocable within the chamber 55. The distance between this chamber 55 and cylinder 40 being short and direct, there is slight opportunity for the different colors of material to become thoroughly mixed. Thus, by reason of these short direct passages 57, the contrasting colors remain in globules or patches suspended within the plastic mass. Consequently, when the carrying block 40 moves downwardly relative to the piston 42, the plastic mass is forced through passages 65 in the piston 42 with little agitation or mixing of the colors and is formed in the mold cavity or around the insert to effect the desired color appearance.

This plunger 62 is thus moved by the admission of hydraulic pressure in a cooperating cylinder 66 so as to act against the upper face of the said plunger. The plunger 62 may be returned to its upward position by a coil spring 68 acting between a shoulder 69 on the cylinder 66 and another shoulder 70 on the plunger 62.

During the injecting operation, the material in the cylinder 44 is prevented from flowing back into the chamber 55, by holding the plunger 62 stationary with respect to the carrying block 40. The preferred method of holding the plunger 62 stationary is by maintaining the hydraulic pressure in the cylinder 66 which acts against the upper face of the plunger sufficiently high to balance the pressure on the material in the chamber 55 and cylinder 44 which acts against the lower face of the said plunger.

It will be noted that in this modification the passages 57 are not provided with check valves like the passages 21 in the previously described form and consequently the operating cycle is slightly different. The preferred cycle of operation, therefore, is substantially as follows:

For the purpose of description, the cycle may begin when the cylinder 44 and chamber 55 are both filled with material, at which time the mold sections 1 and 2 close, as before, to form the mold cavities. The nozzle portion 43 of the piston 42 then contacts the seat 6, the nozzle being held in pressure engagement against the seat by the hydraulic pressure acting on the piston 47.

Injection of the material takes place as the carrying block 40 moves bodily toward the mold sections and relative to the piston 42. During this injection, the plunger 62, however, remains stationary with respect to the carrying block 40 so that the material in the cylinder 44 is expelled therefrom through passages 65 into the sprue 5, gates 4, and cavities 3. Thus, the plunger 62 acts in lieu of a check valve to prevent the return of the material into the chamber 55.

At the completion of the injecting operation, the carrying block 40 moves away from the sections 1 and 2, the action of the spring 50 allowing the nozzle to remain in contact with the seat 6 during this movement. Concurrently with the movement of the carrying block away from the mold, the plunger 62 may be moved into the chamber 55 to transfer the charge therein to the injecting cylinder 44.

This transferring operation is accomplished by admitting hydraulic pressure into the chamber 66, forcing plunger 62 and the material downwardly. After the charge has thus been transferred, and the pressure in cylinder 66 has been relieved, plunger 62 is moved upwardly by the spring 68 an amount sufficient to allow a new charge to be deposited in the chamber 55.

The nozzle then breaks contact from the seat 6 to allow the mold sections to be opened and thus permit ejection of the finished articles therefrom. During the ejecting operation and the insertion of new inserts, the material in both the chamber 55 and cylinder 44 is absorbing heat from the steam passing through conduits surrounding the said chamber and cylinder.

From the above description, it will be seen that the present invention discloses an efficient, compact means for transferring a charge of raw thermoplastic material containing various colors from the loading chamber to the cavities without causing an intimate mixture of the colors so that the resultant finished article possesses an attractive surface of sharply contrasting color striations.

Although two illustrative forms of the present invention have been shown and described, it will be apparent to those skilled in the art that other forms may be made without departing from the spirit and scope thereof and defined in the appended claims.

Having thus described my invention, what I claim is:

1. The method of preparing a charge of thermoplastic material comprising granules of various colors for injection into a mold cavity comprising placing the charge in a loading chamber with granules of the same color grouped together in localized zones, heating the loading chamber to at least partially plasticize the charge, transferring the charge by pressure to an injecting chamber in a direction toward the mold cavity while maintaining portions of the different colors of the material in localized unmixed masses respectively and then injecting the composite charge into the mold cavity from the injection chamber.

2. The method of injection molding of articles of thermoplastic materials to provide well defined color striations on the finished article which comprises grouping different colored granules of the thermoplastic material in predetermined relation, plasticizing the granules by heat while maintaining the plastic colored masses resulting from the granules generally in the same relative positions with respect to each other as were the original granules and then simultaneously injecting portions of the different plasticized masses into a mold through a single passage leading to the mold.

3. The method of injection molding of articles of thermoplastic materials to provide well defined color striations on the finished article, which comprises grouping granules of the thermoplastic material of different colors in predetermined relation in a charging chamber, plasticizing the granules by heat in said chamber while maintaining the plastic colored masses resulting from the granules generally in the same relative positions with respect to each other as were the original granules, then causing the plasticized charge to flow directly from the charging chamber into an injection chamber at a plurality of separated points to charge the injection chamber while maintaining large portions of colored masses unmixed with other colored masses, then injecting the charge in the injection chamber into a mold cavity in streams of segregated color, which streams finally unite to form a single stream leading to the cavity.

4. The method of obtaining striated effects in the injection of thermoplastic material into a mold cavity, comprising placing a charge of thermoplastic material in separate masess into a loading chamber, subjecting the material to a plasticizing temperature, transferring the charge of material into an injecting chamber separate from the loading chamber and in close proximity thereto and causing the different mass portions of the charge to enter the injecting chamber at a plurality of spaced points concurrently, and then forcing the material from the injection chamber into the mold cavity.

5. The method of producing color striations in articles of thermoplastic material comprising placing a charge of thermoplastic material including granules of various colors in a heating chamber and plasticizing the same therein by heat, meanwhile maintaining the material of one color separate from that of another, applying pressure to the plasticized material to discharge it at a plurality of distributed points into an injection chamber, whereby the respective masses become disposed in the injection chamber with localized color portions generally unmixed and in different zones of said chamber, and then ejecting the charge from the injecting chamber into a mold cavity, whereby the various colors of the material enter the cavity and are maintained in sharp contrasting color striations throughout the article.

6. A device for injecting molten plastic material under pressure into a cavity of a mold, said device comprising a carrying block adapted to be moved toward and away from the mold, walls defining an injection cylinder in said carrying block, an injection piston reciprocable in said injection cylinder, a chamber in the carrying block and coaxial with and closely adjacent to the injecting cylinder and provided with a plurality of ports connecting the chamber with the injection cylinder and opening into the cylinder at a plurality of spaced points, and piston means in the chamber constructed and arranged to be moved in and relative to the chamber independently of the injecting piston in a manner to transfer the plastic material therefrom through the said ports to the injection cylinder, said carrying block being constructed and arranged to be moved relative to the injecting piston in a manner to force the material from the injecting cylinder into the mold cavities.

7. A device for injecting plastic material into a mold cavity having an introduction passage, comprising a carrying block relatively movable toward and away from the mold, the block having a cylindrical recess, a plunger adapted to reciprocate in the recess, duct means extending longitudinally of the plunger and communicating at one end with the recess, said duct means having a single outlet portion adapted to register with such mold cavity passage, an annular loading chamber in the carrying block in close proximity to and surrounding the cylindrical recess, openings in the side of the carrying block and leading to the loading chamber for separately introducing and arranging different portions of a charge of plastic material into the loading chamber, ports connecting the loading chamber with the cylindrical recess, plunger means operable within the loading chamber and constructed and arranged to transfer the charge therein through the ports into the cylindrical recess, the plunger and cylindrical recess being constructed and arranged to be moved relative to each other after transference of the charge to the cylindrical recess as aforesaid for injecting such charge into the mold through said duct means of the plunger.

8. A device for injecting plastic material into a mold cavity through a passage in said mold comprising a carrying block relatively movable toward and away from such mold, a cylinder member in the carrying block, a piston member reciprocable in the cylinder member, a duct formed in said piston, said duct having an inlet communicating with the cylinder member and an outlet disposed in alignment with the said passage, a loading chamber in close proximity to the cylinder member, ports connecting the loading chamber with the cylinder member, plunger means operable within the loading chamber, the piston and the cylinder member being constructed and arranged upon relative movement in one direction to inject a charge of plastic material into the cavity, and check valve means for checking the flow of material from the cylinder member toward the loading chamber when the piston moves relative to the cylinder member to inject the material into the mold.

9. Apparatus for injecting plastic material into a mold cavity under pressure through an injection passage leading to said cavity, said apparatus comprising an injection cylinder, a duct leading from the cylinder and adapted for connection with said passage, a loading chamber coaxial with the injection cylinder and having separate openings through which the loading chamber can be charged, a plurality of spaced ports leading respectively from separate chargeable regions of the loading chamber and entering said injection cylinder in spaced relation to each other, and plunger means reciprocable in said loading chamber for transferring a charge of plastic material from the loading chamber to the injection chamber through said spaced ports while maintaining the charge in unmixed condition.

JAMES S. REID.